United States Patent
Ruggiero et al.

(10) Patent No.: US 11,280,751 B2
(45) Date of Patent: Mar. 22, 2022

(54) SYSTEM AND METHOD FOR OPTIMIZING A MANUFACTURING PROCESS BASED ON AN INSPECTION OF A COMPONENT

(71) Applicant: General Electric Company, Schenectady, NY (US)

(72) Inventors: Eric John Ruggiero, Cincinnati, OH (US); James Tallman, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 414 days.

(21) Appl. No.: 16/209,884

(22) Filed: Dec. 4, 2018

(65) Prior Publication Data
US 2020/0173943 A1 Jun. 4, 2020

(51) Int. Cl.
G06Q 50/04 (2012.01)
G01N 25/72 (2006.01)
G01B 21/08 (2006.01)

(52) U.S. Cl.
CPC ............ *G01N 25/72* (2013.01); *G01B 21/085* (2013.01); *G06Q 50/04* (2013.01)

(58) Field of Classification Search
CPC ........ G01N 25/72; G06Q 50/04; G06Q 10/04; G01B 21/085; G05B 2219/45147; F01D 5/14; F01D 5/005; F05D 2230/00
See application file for complete search history.

(56) References Cited

U.S. PATENT DOCUMENTS

| 6,394,646 | B1 | 5/2002 | Ringermacher et al. |
| 7,504,838 | B1* | 3/2009 | Zhao ................... G01R 31/2831 324/754.23 |
| 7,549,789 | B2 | 6/2009 | Tralshawala et al. |
| 7,966,883 | B2 | 6/2011 | Lorraine et al. |
| 8,209,839 | B1* | 7/2012 | Brostmeyer ............ F01D 5/005 29/407.05 |

(Continued)

OTHER PUBLICATIONS

Doom, Travis R., "Aeroderivative Gas Turbines", Aug. 31, 2013, American Energy Innovation Council, URL: http://americanenergyinnovation.org/wp-content/uploads/2013/08/Case-Gas-Turbines.pdf, 12 pages.

(Continued)

*Primary Examiner* — Thomas C Lee
*Assistant Examiner* — Charles Cai
(74) *Attorney, Agent, or Firm* — Fitch, Even, Tabin & Flannery LLP

(57) ABSTRACT

There are provided a system and a method of use thereof for executing a manufacturing process. For example, a method can include executing, by a system configured to drive the manufacturing process, a set of manufacturing functions based on a digital model of a first part. The method can include fetching, by the system, from an in-field scoring system, performance data relating to a second part. The method can further include constructing the digital model based on the performance data relating to the second part. The method can further include generating, based on the digital model, a forecast representative of a performance of the first part and generating the set of manufacturing functions based on the digital model and the forecast. The method further includes manufacturing the first part according to the set of manufacturing functions.

20 Claims, 3 Drawing Sheets

(56) References Cited

U.S. PATENT DOCUMENTS

| | | | |
|---|---|---|---|
| 8,692,887 B2* | 4/2014 | Ringermacher | G01B 11/0658 |
| | | | 348/164 |
| 9,817,452 B2 | 11/2017 | Evens et al. | |
| 10,860,013 B2* | 12/2020 | Dagnino | G01M 99/00 |
| 2009/0030752 A1* | 1/2009 | Senturk-Doganaksoy | |
| | | | G06Q 10/04 |
| | | | 705/7.41 |
| 2009/0297336 A1 | 12/2009 | Allen et al. | |
| 2011/0137575 A1* | 6/2011 | Koul | G05B 23/0283 |
| | | | 702/34 |
| 2011/0153295 A1* | 6/2011 | Yerramalla | G06F 30/20 |
| | | | 703/7 |
| 2017/0102287 A1* | 4/2017 | Okerson | G01M 9/04 |
| 2018/0005368 A1 | 1/2018 | Nalladega et al. | |
| 2018/0027190 A1* | 1/2018 | Srinivasan | G01J 5/0014 |
| | | | 348/164 |
| 2020/0162724 A1* | 5/2020 | Neser | G01S 19/01 |

OTHER PUBLICATIONS

Extended European Search Report from EP Appl. No. 19213171.2, dated Jun. 22, 2020.

* cited by examiner

100

SYSTEM AND METHOD FOR OPTIMIZING A MANUFACTURING PROCESS BASED ON AN INSPECTION OF A COMPONENT

TECHNICAL FIELD

The present disclosure generally relates to a system and a method of use thereof for executing a manufacturing process. More particularly, the present disclosure relates to a system and a method of use thereof that allows the inspection of a component of an asset in order to drive one or more manufacturing parameters for the manufacturing of similar components.

BACKGROUND

In typical industrial manufacturing processes, there can be a discrepancy between the operational performance of a manufactured part when it is commissioned and the intended performance of the as-manufactured part. For example, and not by limitation, there can be a discrepancy in how an airfoil is intended to perform upon manufacture and how that airfoil will endure on an engine under specific operating conditions. As such, in order to ensure high quality parts, industrial manufacturing processes focus on producing parts that meet stringent dimensional tolerances. However, this is only a first order optimization of the as-manufactured part.

For example, the potential discrepancy between an as-manufactured part and its performance is particularly important in aircraft engine design and maintenance. As aircraft engine core components are forced to run at higher temperatures with less cooling flows available, the distribution of component robustness associated with manufacturing variations is exacerbated. As such, specific performance conditions that may be monitored via field inspections (either partial or full) of parts must be considered when manufacturing future parts. The partial field inspections, which may be conducted more often, are should be correlated to full field inspections in order to extrapolate the quality of the entire component. Typical manufacturing processes do not integrate as typical manufacturing systems lack this capability.

SUMMARY

The embodiments featured herein help solve or mitigate the above-noted issues as well as other issues known in the art. The embodiments or variations thereof, as would be achievable in view of the present disclosure, allow the integration of field performance measurements and the robustness of a component into manufacturing processes. As such, the embodiments can allow a manufacturing facility to tune its manufacturing process for a component to functional parameters or performance metrics rather than only optimizing, as is done traditionally, the manufacturing process to produce the part with a predetermined tolerance on one or more physical parameters.

For example, and not by limitation, with an embodiment, a part may be manufactured based on data-driven models relating to the performance of the part and/or the asset in which the part is to be used. This is in contrast to traditional manufacturing processes that focuses only on producing parts having geometrical characteristics that fit within a predetermined tolerance. For instance, as another non-limiting example, an embodiment can allow the manufacture of a component in the hot gas path of an engine to be optimized according to its thermal performance rather than be optimized solely based on a toleranced dimension of the component.

One example embodiment includes a method for executing a manufacturing process. The method includes executing, by a system configured to drive the manufacturing process, a set of manufacturing functions based on a digital model of a first part. The method includes fetching, by the system, from an in-field scoring system, performance data relating to a second part similar to the first part. The method further includes constructing the digital model based on the performance data relating to the second part. The method further includes generating, based on the digital model, a forecast representative of a performance of the first part and generating the set of manufacturing functions based on the digital model and the forecast. The method further includes manufacturing the first part according to the set of manufacturing functions.

Another example embodiment provides a system for executing a manufacturing process to manufacture a first part. The system includes a processor and a memory including instructions that, when executed by the processor, cause the processor to perform certain operations. The operations may include executing a set of manufacturing functions for manufacturing a first part. The operations may further include fetching, from an in-field scoring system, performance data relating to a second part and constructing a digital model based on the performance data relating to the second part. The operations may further include generating, based on the digital model, forecast data representative of a performance of the first part and generating the set of manufacturing functions based on the digital model and the forecast data. The operations may further include manufacturing the first part according to the set of manufacturing functions.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

Figure 1:
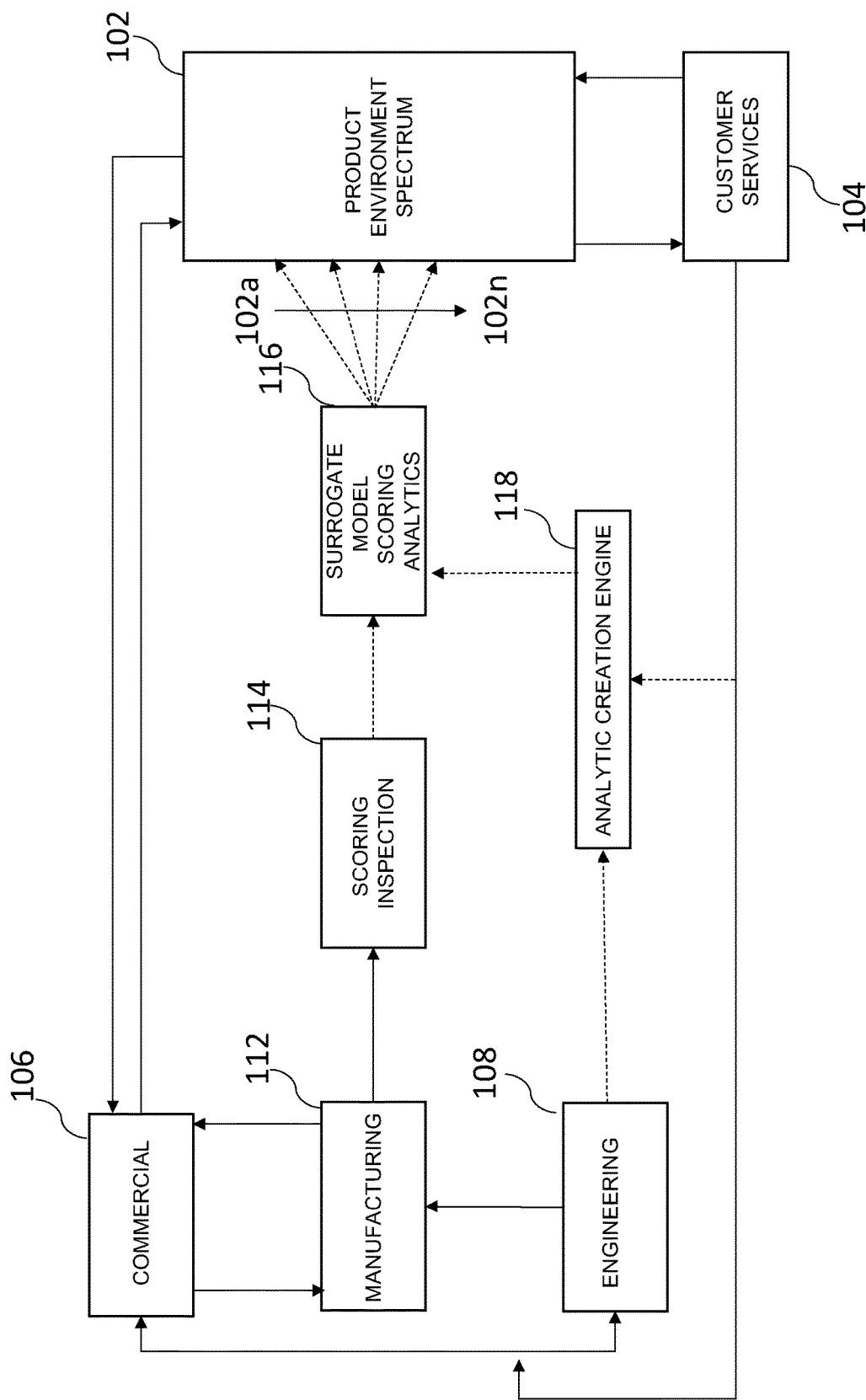
FIG. 1 illustrates a process according to an embodiment.

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

As previously stated, typical methods of inspection of components focus on physical parameters. For example, and not by limitation, gas turbine hardware (e.g. blades, nozzles, shrouds, liners, etc.) are typically inspected using point measurements geared towards a toleranced dimension. The assumption is that as long as the resultant feature falls within a certain tolerance band, then, at the engine level, it is expected that all components will function properly over their intended lifecycles. In practice, this is untrue. For example, it is typical for a turbine blade kit to exhibit only 1 or 2 distressed blades (beyond serviceable limits) out of a total kit size of 60 blades. These distressed outliers are on the lower end of the component robustness distribution curve albeit being within the overall allowable tolerances for that component.

The embodiments featured herein allow the optimization of manufacturing capabilities at the process level. For example, and not by limitation, knowing a desired quality and monitoring the output from a drilling process, with the embodiments, it becomes possible to discern the quality deviation of an as-manufactured part and possible to identify a manufacturing process deviation of the drill to improve its quality.

Furthermore, the embodiments featured herein include application-specific hardware, software, and combinations thereof that shift away from the point measurements paradigm, which typically focused on purely geometric feature details, to a field functional inspection paradigm. As an example, from a thermal perspective, a component's hot gas path's thermal robustness may be driven by one or more parameters. These parameters may be: 1) the quality of the film cooling setup on the external surface; 2) the quality of the thermal or environmental barrier coating thickness distribution across the surface of the part; and 3) the quality of the internal heat transfer coefficients within the internal passageways (for serpentine-cooled parts).

Together, these qualities represent the ability of the component to perform one of its intended functions: namely, to keep the component's operating temperature below a certain threshold requirement. Furthermore, the extent as to how much of these qualities are possessed by an individual component do not necessarily directly correlate with the dimensional measurements associated with defining the specific geometry associated with that particular component. As such, the quality/function needs to be measured directly on the component, in order to ensure that the component will function properly.

While current inspection techniques focus on obtaining geometric data from the part, the embodiments are associated with a direct and functional measurement of the part's capability, and as such they allow the production of parts that are tailored to achieving a predetermined thermal robustness. The production of such a part, according to an embodiment, is based on integrating field inspection data at the process level. These data may be collected from a variety of inspection techniques (either full, partial, or a combination thereof) associated with the parts, such as but not limited to, pressure sensitive paint applied on the part, blue light inspection, white light inspection, and infrared-based inspection techniques. In some embodiments, the part may include a sleeve or jacket having pressure-sensitive paint on its surface; in these embodiments, the pressure sensitive paint is not in contact with the part.

This approach is advantageous because the component's parameters of interest from the perspective of the engine's operation are, in the above-noted example, the three thermal parameters. As such, the embodiments help focus the manufacturing process on the component's thermal or cooling performance rather than only on its geometrical features.

Stated otherwise, in one embodiment, the processes on the shop floor for producing a component would actually be tailored to achieving a certain minimal thermal robustness, and the field inspection data from the one or more sources described above can be used in conjunction to define a minimal thermal performance criterion across the entire component.

In one example use case, the embodiments featured herein can be used for hot gas path inspection in turbomachinery. The embodiments replace geometric-centered inspection with field inspection technologies that interrogate the field and functional performance of the part. In doing so manufacturing parameters can be finely tuned to meet a specified minimum robustness parameter requirement (in this case, primarily thermal) to meet expected component service life. As such, the embodiments provide a novel system and method for integrating inspection technologies on the manufacturing shop floor or service shops.

The embodiments thus offer several advantages that are in contrast to current inspection techniques which are focused on obtaining geometric data from the part. Several example embodiments are described below; the methods and systems described are discussed in the context of aircraft parts, but one of ordinary skill in the art will readily understand that they can be applied to other contexts, i.e. in other industries, without departing from the present disclosure.

FIG. 1 illustrates a process 100 in accordance with an exemplary embodiment. The process 100 may be a process associated with the lifecycle of a component and/or a general manufacturing cycle. While the process 100 is described in the context of air plane or jet engine parts, it may extend to the manufacture or in general to the lifecycle of any manufactured component. The process 100 includes a module 102 that is a product environment spectrum. In other words, the module 102 can be a database that stores information of/about instances of the same product as they are used in the field.

For example, the module 102 may include information about the reliability or failure of a plurality of turbine blades as they are commissioned in a fleet of engines (i.e., in two or more engines, or generally on two or more planes). The module 102 may be configured to organize, or present upon request from a device communicatively coupled thereto, a product environment spectrum which sorts all of the products of interest in a predetermined order.

For example, the products may be sorted from most robust (102a) to nominal/best fuel burn performance (102n). Generally, one or more criteria may be used to sort these products according to the aforementioned spectrum. For example, in the case of a turbine blade, the products may be sorted according to their thermal performance, which may be measured using one or more field inspection methods, which may be either full or partial or a combination thereof.

One or more of these measurements may then be provided into an analytics/analytical module for determining the overall "score" for that particular part. In some instances, that analytical module may be based on physics-based modeling (like Finite Elements models), data-based modeling (i.e., drawing comparisons against previous knowledge of how a part with similar signals performed in the field), machine learning/artificial intelligence models, or any other means of creating analytic modules.

The product environment spectrum may be driven by constraints from customers, which may be collected and functionalized (i.e., put in the form of computer instructions) in the module 104. Similarly, the product environment spectrum may be driven by commercial constraints, which may be functionalized in the module 106. These constraints (for both the modules 104 and 106) may be updated as the manufacturing process is updated in view of the various sources of information, as shall be further described below.

The customer constraints of the module 104 may also drive the engineering functions of the module 108, which in turn drive the manufacturing decisions, as functionalized in the module 112. Once the engineering decisions are functionalized, they may be used to establish a digital thread that is configured for design; this is achieved via an analytic creation engine module 118.

In an exemplary embodiment, the model analytics are designed/created/adapted/changed/in the analytic creation engine module 118. Generally, the analytic creation engine module 118 may gather information from one or more sources. For instance, the one or more sources may include the engineering module 108, in the form of physics-based design and simulation models. The one or more sources may include field experience modules such as the module 104 and/or the module 111, in the form of data associated with past product usage. The one or more sources may include the previous inspection data on a part-by-part basis, taken under the module 114, which is connected directly on a part-by-part basis with the field experience data. (e.g. to modules 104 and 111).

The data associated with a part at the module 114 and the data associated with the same part from the module 104 are linked together in a digital format, for consumption by the analytic creation engine module 118. Furthermore, in the exemplary embodiment, the analytic creation engine module 118 may use machine learning and/or artificial intelligence to create a surrogate model that is trained by both the results of the physics-based design, simulation models, and data the field experience modules. In another embodiment, the analytic creation engine module 118 correlates the previous inspection data from the module 114 and the field experience data from either the module 111 or the module 104, and it creates a regression on a part-by-part basis that can be used to forecast future field experience based on the future inspection data from the module 114. The surrogate model scoring analytic module 116 is where the analytic calculation is applied to the inspection data from the module 114, in order to create the score (102a-102n) for that particular part.

Figure 2:
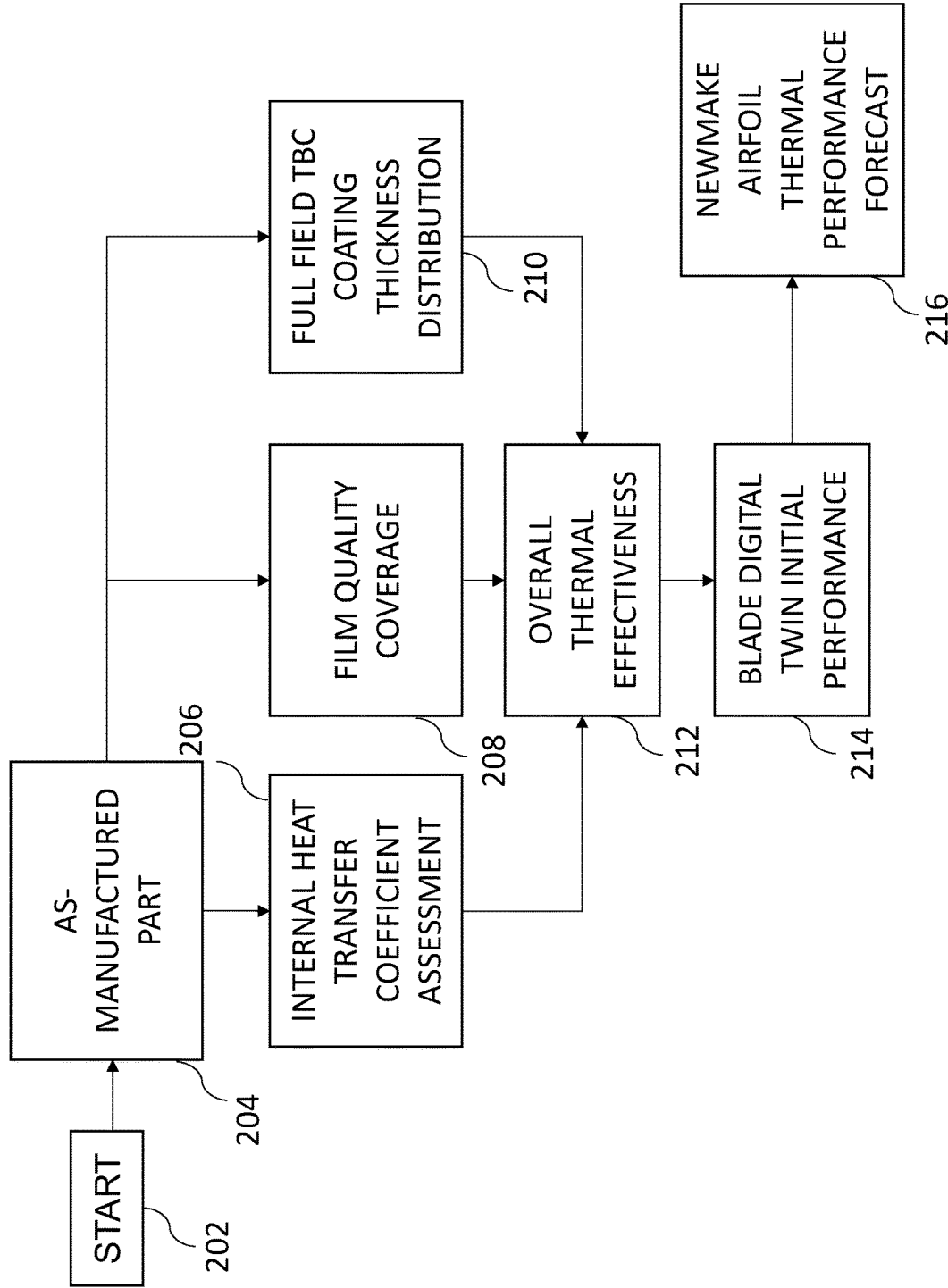
FIG. 2 illustrates a method according to an embodiment.

FIG. 2 illustrates an exemplary method 200 that may be executed by a manufacturing system executing the process 100, according to an embodiment. The method 200 begins at step 202. Performance data from an as-manufactured part from a known manufacturing process/practice are functionalized via a plurality of inspection techniques (step 204). These data may be generated from one or more field inspection modules (steps 206, 208, and 210). In each of these steps, for example, data relative to an internal heat coefficient of the part, film coverage quality of the part, and full-field TBC coating thickness distribution of the part, may be transmitted to a subsystem module that generates an effective thermal performance of the part (step 212).

Specifically, the effective thermal performance may be determined by the scoring analytic module 116. In one embodiment, this determination can include comparing the assessed thermal effectiveness against all the other parts, and a score (102a-102n) may be assigned to the as-manufactured part based on the comparison. The assessed thermal effectiveness performance is then used to create a digital twin (step 214) which is then used to assess the new-make part thermal performance at step 216, by providing a performance forecast.

Figure 3:
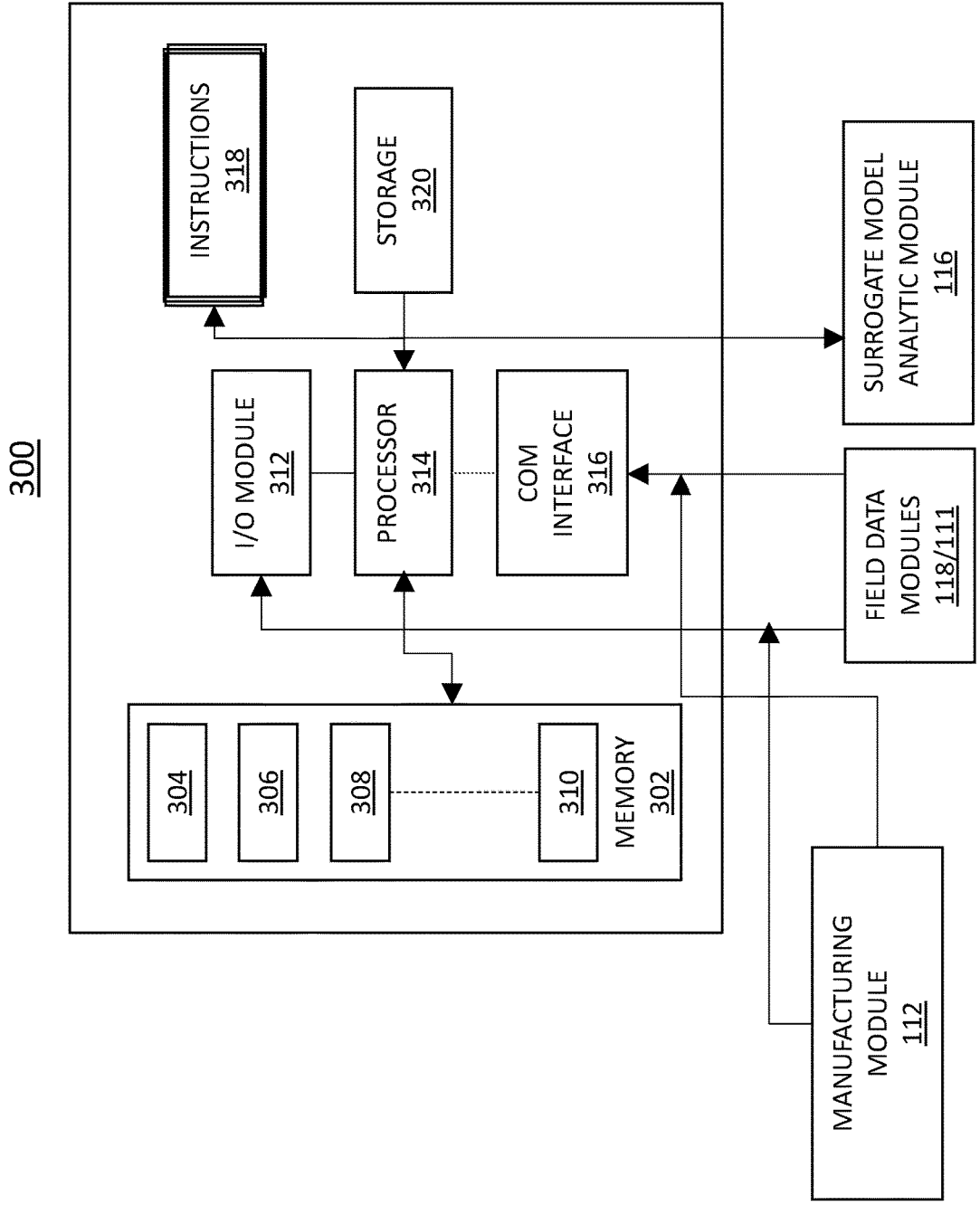
FIG. 3 illustrates a system according to an embodiment.

Having described several exemplary methods and processes, an application-specific system that is configured to undertake these processes is now described. FIG. 3 depicts a system 300 that includes an application-specific processor 314 configured to perform tasks specific to optimizing and executing a manufacturing process. The processor 314 has a specific structure imparted by instructions stored in a memory 302 and/or by instructions 318 that can be fetched by the processor 314 from a storage 320. The storage 320 may be co-located with the processor 314, or it may be located elsewhere and be communicatively coupled to the processor 314 via a communication interface 316, for example. Furthermore, in some embodiments, the system 300 may be part of a cloud-based computing infrastructure providing cloud-based computing services.

The system 300 can be a stand-alone programmable system, or it can be a programmable module located in a much larger system. For example, the system 300 be part of a distributed system configured to handle the various modules of the process 100 described above. The processor 314 may include one or more hardware and/or software components configured to fetch, decode, execute, store, analyze, distribute, evaluate, and/or categorize information. Furthermore, the processor 314 can include an input/output module (I/O module 312) that can be configured to ingest data pertaining to single assets or fleets of assets.

The processor 314 may include one or more processing devices or cores (not shown). In some embodiments, the processor 314 may be a plurality of processors, each having either one or more cores. The processor 314 can be configured to execute instructions fetched from the memory 302, i.e. from one of memory block 304, memory block 306, memory block 308, and memory block 310.

Furthermore, without loss of generality, the storage 320 and/or the memory 302 may include a volatile or non-volatile, magnetic, semiconductor, tape, optical, removable, non-removable, read-only, random-access, or any type of non-transitory computer-readable computer medium. The storage 320 may be configured to log data processed, recorded, or collected during the operation of the processor 314.

The data may be time-stamped, location-stamped, cataloged, indexed, or organized in a variety of ways consistent with data storage practice. The storage 320 and/or the memory 302 may include programs and/or other information that may be used by the processor 314 to perform tasks consistent with those described herein.

For example, the processor 314 may be configured by instructions from the memory block 306, the memory block 308, and the memory block 310, to perform score inspection tasks and associated analytics, as described above. The processor 314 may execute the aforementioned instructions from memory blocks, 306, 308, and 310, and output a twin digital model that is based on in-field performance test data and communicate the twin digital module to a manufacturing process system for subsequent fabrication of a new part that is optimized based on in-field conditions.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for optimizing a manufacturing process, the method comprising:
executing, by a system configured to drive the manufacturing process, a set of manufacturing functions for a first part, the executing including:
fetching, by the system, from an in-field scoring system, performance data relating to a second part similar to the first part;
generating and assigning a score for the second part based on a comparison of performance data of the second part relative to performance data of a plurality of in-field parts according to a product environment spectrum;
constructing a digital model based on the performance data relating to the second part and the score;
generating, based on the digital model, a forecast representative of a performance of the first part;
generating the set of manufacturing functions based on the digital model and the forecast; and
manufacturing the first part according to the set of manufacturing functions.

2. The method of claim 1, further comprising collecting the performance data via at least one inspection device.

3. The method of claim 1, further comprising collecting the performance data via one of pressure sensitive paint of the second part, a blue light inspection device, a white light inspection device, and an infrared-based inspection device.

4. The method of claim 1, wherein the performance data is related to a thermal performance of the second part.

5. The method of claim 1, wherein the performance data is related to a thermal performance of a cooling film.

6. The method of claim 1, wherein the performance data is related to a thickness distribution of a thermal or environmental barrier coating.

7. The method of claim 1, wherein the performance data is related to a thermal effectiveness of the second part.

8. The method of claim 1, wherein the second part is a hot gas path component.

9. The method of claim 1, wherein the manufacturing process is not optimized according to a geometrical feature of the second part.

10. A system for executing a manufacturing process to manufacture a first part, the system comprising:
a processor;
a memory including instructions that, when executed by the processor, cause the processor to perform operations comprising:
executing a set of manufacturing functions for manufacturing a first part, the executing including:
fetching, from an in-field scoring system, performance data relating to a second part similar to the first part;
generating and assigning a score for the second part based on a comparison of performance data of the second part relative to performance data of a plurality of in-field parts according to a product environment spectrum;
constructing a digital model based on the performance data relating to the second part and the score;
generating, based on the digital model, forecast data representative of a performance of the first part;
generating the set of manufacturing functions based on the digital model and the forecast data; and
manufacturing the first part according to the set of manufacturing functions.

11. The system of claim 10, wherein the operations further include collecting the performance data via at least one inspection device.

12. The system of claim 10, wherein the operations further include collecting the performance data via one of pressure sensitive paint applied on the second part, a blue light inspection device, a white light inspection device, and an infrared-based inspection device.

13. The system of claim 10, wherein the performance data is related to a thermal performance of the second part.

14. The system of claim 10, wherein the performance data is related to a thermal performance of a cooling film.

15. The system of claim 10, wherein the performance data is related to a thickness distribution of a thermal or environmental barrier coating.

16. The system of claim 10, wherein the performance data is related to a thermal effectiveness of the second part.

17. The system of claim 10, wherein the second part is a component in a hot gas path of an engine.

18. The system of claim 10, wherein the manufacturing process is not optimized according to a geometrical feature of the second part.

19. The system of claim 10, wherein the manufacturing process is optimized according to performance data from a plurality of in-field parts.

20. The system of claim 10, wherein the manufacturing process is optimized according to performance data relating an aircraft engine.

* * * * *